J. P. SEXTON

PLASTER LATH.

APPLICATION FILED SEPT. 20, 1915.

Reissued June 6, 1916.

14,148.

2 SHEETS—SHEET 1.

Witness

Elwood H. Benhelm

Inventor

James P. Sexton by James T. Benhelm his Attorney.

J. P. SEXTON.

PLASTER LATH.

APPLICATION FILED SEPT. 20, 1915.

Reissued June 6, 1916.

14,148.

2 SHEETS—SHEET 2.

Witness.
Edward H. Benkelen

Inventor
James P. Sexton,
by James T. Benkelen
his Attorney.

UNITED STATES PATENT OFFICE.

JAMES P. SEXTON, OF LOS ANGELES, CALIFORNIA, ASSIGNOR, BY MESNE ASSIGNMENTS, TO BUTTONLATH MANUFACTURING COMPANY.

PLASTER LATH.

14,148. Specification of Reissued Letters Patent. Reissued June 6, 1916.

Original No. 1,115,593, dated November 3, 1914, Serial No. 797,756. Application for reissue filed September 20, 1915. Serial No. 51,726.

*To all whom it may concern:*

Be it known that I, JAMES P. SEXTON, a citizen of the United States, residing at Los Angeles, in the county of Los Angeles and State of California, have invented a new and useful Plaster Lath, of which the following is a specification.

This invention relates to a plaster lath or mortar lath, which is adapted to be used as a base or foundation for the plaster coat on walls and ceilings of buildings, and the main object of the present invention is to provide for securely locking or keying the plaster coat to the said base.

A further object of the invention is to provide a plaster lath base for the purpose stated, which will be unaffected by water, so that there is no swelling or warping of the base of any portion thereof by reason of the dampness of the applied coat of plaster, and whereby any looseness or hollow spaces in the plaster coat is avoided.

Other objects of the invention will appear hereinafter.

Figure 1:
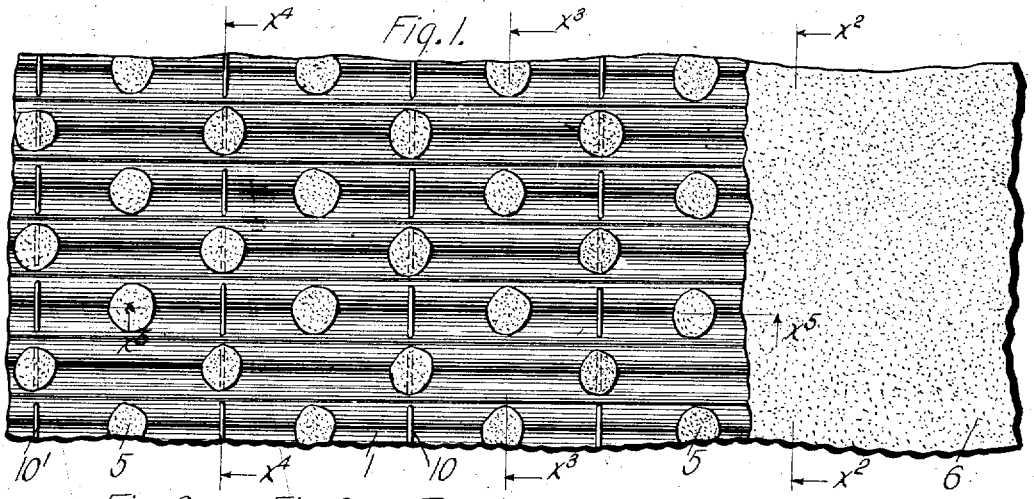
Figures 2, 3, 4, 6, 7:
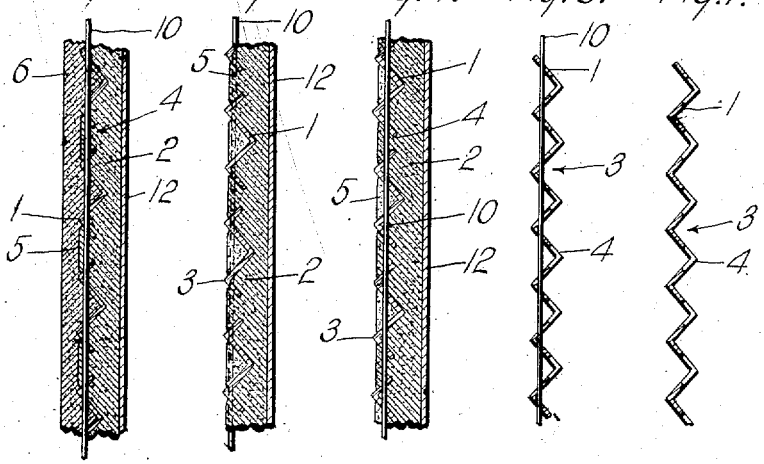
Figure 5:
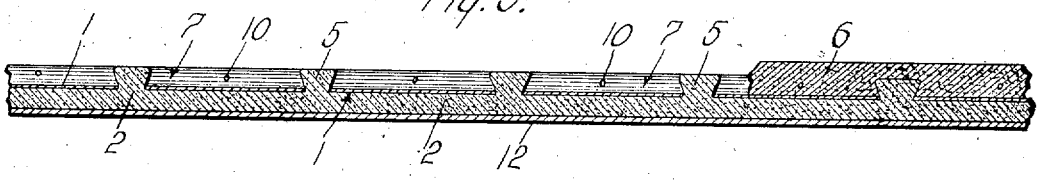
Figure 8:
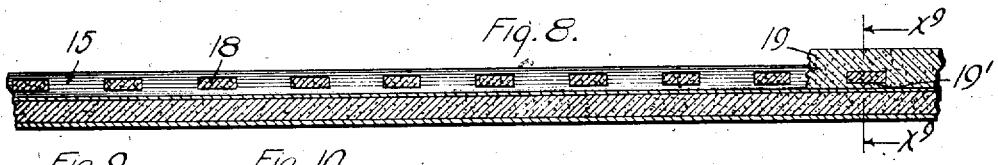
Figure 9:
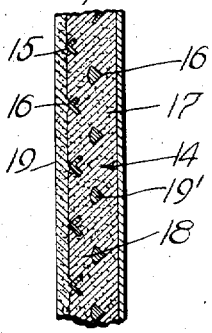
Figure 10:
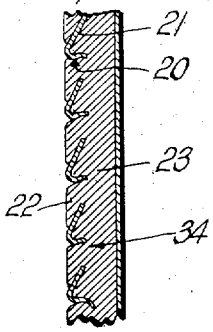
Figure 16:
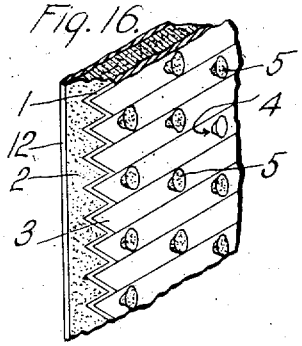
Figure 11:
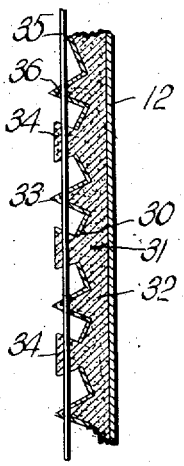
Figure 12:
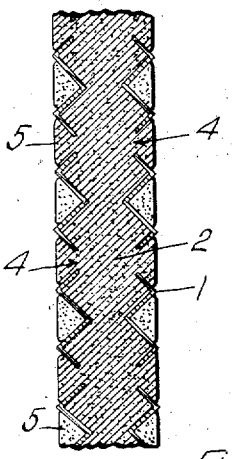
Figure 15:
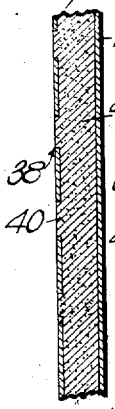
Figure 14:
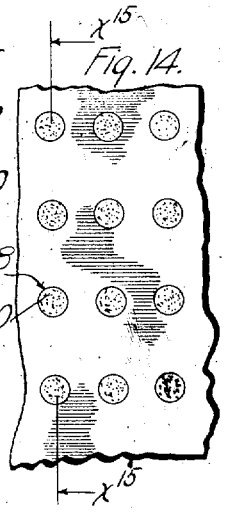
Figure 13:
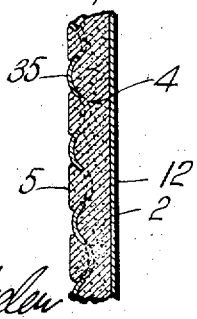
Figure 17:
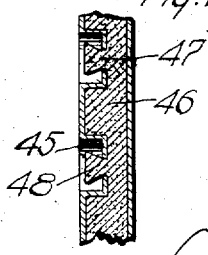

The accompanying drawings illustrate embodiments of my invention, and referring thereto:

Figure 1 is a front elevation of a portion of the plaster lath showing at one part thereof the plaster coat applied thereto. Fig. 2 is a section on line $x^2$—$x^2$ Fig. 1. Fig. 3 is a section on line $x^3$—$x^3$ Fig. 1. Fig. 4 is a section on line $x^4$—$x^4$ Fig. 1. Fig. 5 is a section on line $x^5$—$x^5$ Fig. 1. Fig. 6 is a sectional view of a portion of the paper formed with reinforcing wire therein. Fig. 7 is a sectional view of the paper formed without the wire. Fig. 8 is a longitudinal section of the form of the invention in which the key perforations are made in the sides instead of the bottom of the corrugations. Fig. 9 is a section on line $x^9$—$x^9$ Fig. 8. Fig. 10 is a vertical section of a form of the invention wherein the corrugations in the paper form are bent over to secure a lateral interlock. Fig. 11 is a vertical section showing the application of the plaster keying buttons in coöperation with reinforcing wires. Fig. 12 is a vertical section showing a double faced wall member adapted to receive a plaster coat on each side. Fig. 13 a vertical section of another form of the invention. Fig. 14 is an elevation of a modified form of my invention. Fig. 15 is a section on line $x^{15}$—$x^{15}$ Fig. 14. Fig. 16 is a perspective of a form of the invention using buttons alone as keying means. Fig. 17 is a sectional view of another modification.

Referring to Figs. 1 to 7, the plaster lath comprises a form sheet or member 1 of paper or other suitable material, a body or base 2 of plaster or mortar in adherent contact with said paper and forming a backing therefor, and keying means in connection with said form sheet and base for insuring the retention of the plaster coat on the outside of the form. In order to facilitate the formation of the keying means and to provide a more effective contact for the applied plaster coat, I prefer to corrugate the form member 1 as shown at 3, and at suitable points therein, for example, at the bottom of the grooves or depressions of said corrugations, said form member is perforated as shown at 4, so that when the plaster or mortar base 2 is applied to said form member, it penetrates through said perforations forming buttons or heads 5, which flare outwardly from said perforations and form effective keys for retention of the plaster coat indicated at 6, both by reason of the adaptability of the plaster surface of said buttons for adhering to the plaster coat, and of the dove-tailed shape of the spaces 7 between said buttons. The projection of these keys over the plaster base, by reason of their enlargement outside of the form sheet, also serves to lock the base to the form sheet. In order to increase the keying action, and to give the effect of "furring", I may provide keying members consisting of wires or cords 10, extending transversely through the corrugations 3 at suitable intervals, for example, through alternating rows of buttons 5, so that certain of said buttons embed or inclose said members 10, while the other buttons do not contain any members 10. I prefer to arrange the buttons in successive corrugations in staggered relation, as shown in Fig. 1, thus providing a close and uniform distribution of the buttons without causing the buttons to be spaced too closely either transversely or laterally. With this staggered relation of the buttons the reinforcing members 10 are left exposed at certain portions as shown at 10′ where they cross the grooves of the corrugations. It will be understood that the term "wires" as herein used includes cords or other equivalents therefor. The above described plaster lath is made by bending the form member 1 into corrugated shape, the form member being preferably water proof, and the base 2 of plaster, mortar or other cementitious or plastic material is then applied to the back of said member 1, and squeezed through the perforations to form the buttons 5. A back facing 12 of paper or other suitable material may then be applied to the plaster or mortar base before the plaster or mortar has become set. The ribs of the corrugations 3 project as high or higher than the plaster buttons 5 and project above said buttons, so that the lathing may be shipped or stored without breaking off the buttons. The structure formed as above described is sufficiently rigid and strong to serve all the purposes of a lathing material, and forms an effective lathing and base for the plaster coat. The plaster lath formed as above described is secured in position on a wall of the building in any suitable manner, for example, by nails driven through the same, and the plaster coat indicated at 6 is applied to the outer face thereof, said plaster coat interlocking with the keying buttons 5, and the keying wires or cords 10, so as to be secured or retained on the base.

The water proofing of form member 1 has the advantage that when the plaster is applied to the plaster lath, as above described, the form member 1 does not absorb water and become swelled or loosened and therefore retains its shape, so that when the plaster coat dries, there are no gaps or vacancies left between the plaster coat and the base. In applying the plaster coat to plastered boards having a paper facing, the objection has arisen that the paper is swelled and warped by the moisture of the plaster coating, and loosened by the weight of the plaster and when the parts become dry the paper shrinks away from the plaster coat leaving vacancies or hollow spaces back of the plaster coating with a result that the plaster coating is liable to become detached. By water proofing the form member for the base, this objection is obviated, and the parts retain their shape throughout the operation. In some cases, however, the supporting action of the buttons and the corrugations is sufficient to prevent sagging of the paper form sheet, even without waterproofing and the waterproofing may then be dispensed with. The cords or wires may be omitted as in the form shown in Fig. 16, the construction being otherwise as above described.

In place of making the perforations in the bottom of the groove in the base, such perforations may, as shown in Figs. 8 and 9, be made in the sides of the corrugations or grooves 15, of the form member 16, so that the mortar or plaster backing or base 17 applied to the back of the form member 16 extrudes through these perforations 14 forming bridges 18, which serve the purpose of keying buttons and permit the plaster coating 19 to flow beneath the same as shown at 19′ to give a more effective keying action.

As shown in Fig. 10, the corrugations 20 of the form member 21 may be bent over so as to overhang the buttons 22 formed by the plaster being forced from the back or base 23 through perforations 34 in the form member, so that said buttons are engaged and retained in such overhanging portions of the corrugations.

As shown in Fig. 11, the form sheet may be provided with such intermediate corrugations indicated at 30 which may be perforated as shown at 31 so as to allow plaster to pass from the back 32 through form 33 and form buttons 34 embodying, or embedding the wire 35 which passes through the main corrugations 36.

By placing two of the above described plaster laths back to back or by doubling over the plaster lathing so as to form a double face member, as shown in Fig. 12, the invention may be used for forming walls, capable of being used for partitions and the like, and adapted to receive plaster coating for each side.

By rounding the corrugations of the form member as indicated at 35 in Fig. 13, the plaster lathing constructed according to my invention is adapted to receive any suitable metallic lathing or wire netting, which can be nailed to the rounded outer edges of the corrugations.

The form member for the plaster lathing may be made flat, as shown in Figs. 14 and 15, and provided with perforations 38, through which the plaster back 29 extends to form keys 40 adapted to contact with and form an adhering surface for the plaster coating.

Instead of corrugating the form sheet, the depressions may be formed as countersinks therein, as shown at 45 in Fig. 17, the plaster base 46 extruding through a perforation 47 at the bottom of each countersink or depression to form a button 48 which is housed or protected by the counter-sink.

The corrugations above described also form depressions for housing and protecting the keys, said keys extending from the plaster base through the perforations into the depressions formed by said corrugations. In such a construction in which the keys project from the form sheet, but are located within the depressions in the form sheet, the keys are protected from damage during storage and shipment and the plaster laths can be stacked or piled upon one another without liability of breaking or injuring the keys. This also provides a flat surface for applying and smoothing plaster over the lath, the tops of the keys being substantially flush with the elevated parts of the form sheet between the depressions.

In the form shown in Fig. 17 there is a cup or depression formed around each button, into which cup the applied superimposed plaster is forced and allowed to set. When once set in this cup around the button, the applied plaster is very firmly bonded to the plaster lath, not only by adhesion of plaster to plaster but by mechanical bond, and also by a peculiar suction action. The plaster surrounding the button is itself surrounded by the body of the plaster lath, and it is consequently practically impossible to pull the intruding plaster off over the end of the button, as it must expand in so doing. Also there is a "suction" action in the cup or depression under the intruding plaster tending to prevent the plaster parting from the plaster lath; this "suction" being caused by the exclusion of air when the plaster is applied. The depressions further have the very good effect of protecting the buttons during manufacture, handling, shipping, etc.

What I claim is:

1. A plaster lath comprising a perforated form member and a cementitious base on the back of said form member, extending through the perforations in the form member and projecting from the form member to form keys.

2. A plaster lath comprising a form sheet having depressions and provided with perforations in said depressions, a cementitious base on the back of said form sheet, and cementitious keys extending from said base forwardly through said perforations and projecting from said form sheet into said depressions.

3. A plaster lath comprising a form sheet having depressions and provided with perforations in said depressions, a cementitious base on the back of said form sheet, and cementitious keys extending from said base forwardly through said perforations and projecting from said form sheet into said depressions, said keys being arranged in rows and in staggered relation in successive rows.

4. A plaster lath comprising a form sheet having depressions and provided with perforations in said depressions, a cementitious base on the back of said form sheet, and cementitious keys extending from said base through said perforations and flaring outwardly so as to project over said form sheet to lock the cementitious base to the form sheet and serve as keys for retaining an applied coating on the face of the plaster laths.

5. Plaster lath comprising a form sheet having depressions and provided with perforations in said depressions, a cementitious base on the back of said form sheet, and cementitious keys extending from said base through said perforations and flaring outwardly so as to project over said form sheet to lock the cementitious base to the form sheet and serve as keys for retaining an applied coating on the face of the plaster laths, the outer end surface of said keys being substantially flush with the outer surface of the said form sheet.

6. As a new article of manufacture, plaster lath comprising a body having depressions on that side which is to receive an applied coating, the body being provided with buttons projecting from that side of the body which is to receive an applied coating, said buttons extending into said depressions, the outer ends of said buttons being substantially flush with the elevated portions of the body, said depressions forming cavities which are filled with the coating when applied, said buttons being surrounded by and embedded in the said coating when the latter is applied, and keying the said coating to the body.

7. A plaster lath comprising a perforated form member and a cementitious base on the back of said form member extending through the perforations in the form member to form protuberances projecting above the immediately surrounding surface of the form member.

8. A plaster lath comprising a form sheet having perforations and provided with individual depressions one around and at each perforation, a cementitious base on the back of said form sheet, and cementitious protuberances integral with said base projecting through said perforations into said depressions and standing above the bottoms of said depressions.

9. A plaster lath comprising a form sheet having perforations and provided with individual depressions one around and at each perforation, a cementitious base on the back of said form sheet, and cementitious protuberances integral with said base projecting through said perforations into said depressions and standing above the bottoms of said depressions, and substantially flush with the undepressed portions of the form sheet.

10. A plaster lath, embodying a cementitious body having a substantially flat face and a plurality of spaced protuberances integral with the body projecting above the immediately surrounding surface of the body face, there being individual depressions in said body face one around each protuberance.

11. A plaster lath, embodying a cementitious body having a substantially flat face and a plurality of spaced buttons integral with the body projecting above the immediately surrounding surface of the body face, there being individual depressions in said body face one around each button, said buttons being larger at their outer ends than at their inner ends to form keys around which an applied plaster may set and be mechanically locked to the body.

12. In a cementitious construction, a body of cementitious substance, a perforated facing sheet for the body having individual surface depressions one around each perforation, the said body projecting through the perforations to form protuberances one in each depression.

13. In a cementitious construction, a body of cementitious material, a perforated facing sheet for the body, the said body projecting through the facing sheet to form a key-shaped protuberance larger at its outer than at its inner end.

14. In a cementitious construction, a body of cementitious material, a form sheet for said body having spaced perforations through which the body is exposed, and said form sheet having depressions one individually surrounding each of the perforations.

15. In a cementitious construction, a body of cementitious material, a form sheet for said body having spaced circular perforations and circular depressions one individually surrounding each perforation, through which perforations and in which depressions the body is exposed.

Signed at Los Angeles, California.

JAMES P. SEXTON.